(12) United States Patent
Kawasaki (10) Patent No.: US 12,543,715 B2
(45) Date of Patent: Feb. 10, 2026

(54) LURE

(71) Applicant: Shimano Inc., Osaka (JP)

(72) Inventor: Tatsurou Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/671,640

(22) Filed: May 22, 2024

(65) Prior Publication Data

US 2025/0008935 A1    Jan. 9, 2025

(30) Foreign Application Priority Data

Jul. 6, 2023  (JP) ................ 2023-111730

(51) Int. Cl.
*A01K 85/18* (2006.01)
(52) U.S. Cl.
CPC .................. *A01K 85/18* (2013.01)
(58) Field of Classification Search
CPC .......................... A01K 85/18; A01K 85/1863
See application file for complete search history.

(56) References Cited

U.S. PATENT DOCUMENTS

| | | | | |
|---|---|---|---|---|
| 11,844,338 | B1* | 12/2023 | Feisel | A01K 85/18 |
| 2019/0008128 | A1* | 1/2019 | Walsh | A01K 85/16 |
| 2021/0274762 | A1* | 9/2021 | Yagi | A01K 85/01 |
| 2021/0352879 | A1* | 11/2021 | Ahmed | A01K 85/1837 |
| 2022/0217958 | A1* | 7/2022 | Olsen | A01K 85/1863 |

FOREIGN PATENT DOCUMENTS

| | | | | | |
|---|---|---|---|---|---|
| CN | 111713467 | A | * | 9/2020 | A01K 85/18 |
| CN | 115336559 | A | * | 11/2022 | A01K 85/18 |
| CN | 116171949 | A | * | 5/2023 | A01K 85/1847 |
| JP | 2021040552 | A | * | 3/2021 | |
| JP | 9-266737 | A | | 4/2022 | |
| JP | 2024068275 | A | * | 5/2024 | |
| KR | 102590468 | B1 | * | 10/2023 | A01K 85/1863 |
| WO | WO-2016109233 | A1 | * | 7/2016 | A01K 85/00 |

* cited by examiner

*Primary Examiner* — Christopher P Ellis
(74) *Attorney, Agent, or Firm* — Spencer Fane, LLP (57) ABSTRACT

A lure includes a head body, a swinging shaft, a truck body and a restricting structure. The swinging shaft extends from the head body toward a tail side. The trunk body is supported around the swinging shaft so as to be capable of swinging. The restricting structure is provided on the trunk body and the swinging shaft. The restricting structure restricts the swing angle of the trunk body. The swinging shaft is fixed to the head body.

8 Claims, 7 Drawing Sheets

LURE

CROSS-REFERENCE TO RELATED APPLICATIONS

This application claims priority to Japanese Patent Application No. 2023-111730, filed on Jul. 6, 2023. The entire disclosure of Japanese Patent Application No. 2023-111730 are hereby incorporated by reference.

BACKGROUND

Technical Field

The present disclosure relates to a lure.

Background Information

Fishing lures, in which one of a plurality of bodies, segmented in a front-rear direction connecting a head side and a tail side, can fully rotate (360°) in a circumferential direction, are known from the prior art (for example, refer to Japanese Laid Open Patent Application No. Hei 9 (1997)-266737 and 2011-87533).

Conventional lures, such as those shown in Japanese Laid Open Patent Application No. Hei 9 (1997)-266737 and 2011-87533), are limited to generating bubbles or sounds in water in order to attract fish. On the other hand, depending on the target fish, there is demand to be able to attract fish, for example by moving the lure in accordance with the tide; and in this respect, there is room for improvement.

SUMMARY

The present disclosure was conceived in light of the above circumstances, and an object thereof is to provide a lure that can carry out a variety of suitable attractive actions depending on the type of fish to be caught.

A first aspect of a lure according to the present disclosure comprises a first body that is disposed on a head side, a shaft that extends from the first body toward a tail side, a second body that is supported around the shaft so as to be able to swing, and a restricting structure that is provided on at least one of the second body and the shaft and restricts a swing angle of the second body.

By the first aspect of the lure according to the present disclosure, when causing the lure to swim, the second body swings with respect to the first body within a range restricted by the restricting structure. Specifically, the first body on the head side swings together with the shaft in accordance with the movement of the fishing line. The second body that is separate from the first body swings in a phase different from that of the first body, causing the second body to move differently from the first body. Then, since the first body and the second body are restricted so as to swing within a prescribed range as described above, a swinging motion can be realized without rotating over the entire circumference. As a result, it is possible to attract fish in a manner not possible for conventional lures, such as changing the light that hits the lure or the vibration frequency of the lure itself when in a swimming attitude.

In addition, in the present disclosure, when the lure is subjected to swash, waves, or the tide, the first body moves differently than the second body in an efficient manner. As a result, it is possible to move the lure so as to blend with the current, for example, thus allowing movement that is more attractive to predatory fish than the movement of convention lures in which the lure simply floats on water.

A second aspect of the present disclosure is the lure according to the first aspect, wherein the shaft is fixed to the first body.

In this case, since the shaft rotates integrally with the first body, it is possible to restrict the swing angle of the second body with respect to the first body.

A third aspect of the present disclosure is the lure according to the first or second aspect, wherein the restricting structure includes a protrusion that protrudes from the shaft and a recess is formed on the second body that houses the protrusion.

In this case, it is possible to set the swing range of the protrusion provided on the shaft by the recess formed on the second body. Therefore, the swing range can be easily set and movement matching the shape of the body can be easily achieved.

A fourth aspect of the present disclosure is the lure according to the third aspect, wherein the recess is an opening in the second body.

In this case, since the thickness portion of the outer wall of the second body can be used as the restricting structure, the space inside the body can be more effectively used than a case in which the restricting structure is provided inside the second body.

In addition, in the present disclosure, it is possible to access the shaft and the restricting structure from outside of the lure via the opening, so that it is possible to perform maintenance of the shaft and the restricting structure, as well as to adjust the swing range, from outside of the lure.

A fifth aspect of the present disclosure is the lure according to the third or fourth aspect, wherein the recess is provided in a lower portion of the second body.

In this case, the shaft and the restricting structure can be arranged in the lower portion of the second body, so that a large space for imparting buoyancy can be provided in the upper portion of the second body.

A sixth aspect of the present disclosure is the lure according to any one of the first through fifth aspects, wherein the second body can include a hole portion through which the shaft is coaxially inserted and that holds the shaft.

In this case, the shaft is swingably held in the hole portion, so that wobbling of the shaft is suppressed, thereby achieving a stable swing of the protrusion, and it is possible to provide a lure with the desired movement.

A seventh aspect of the present disclosure is the lure according to any one of the first through sixth aspects, further comprising, on the tail side of the second body, a third body fixed to the shaft.

In this case, when causing the lure to swim, the second body, the first body and the third body, respectively rotate so as to swing relative to each other within a rotation range restricted by the restricting structure. Specifically, the first body rotates together with the third body and the shaft in accordance with the movement of the fishing line, and the second body, which is separate from the first body and the third body, rotates later than the first body and the third body. Thus, the second body moves differently from the first body and the third body. As a result, it is possible to generate bubbles and sounds in the water to excellently attract fish.

An eighth aspect of the present disclosure is the lure according to the seventh aspect, further comprising at least one body between the second body and the third body.

In this case, a plurality of intermediate bodies including the second body are provided between the first body and the third body, so that complex movements (attraction) of the lure can be achieved by the plurality of intermediate bodies. The plurality of intermediate bodies can be configured such that, for example, intermediate bodies that can swing relative to the shaft and intermediate bodies that are fixed are alternately arranged, or such that the swing angle of each of the swingable intermediate bodies is different.

By the lure according to the present disclosure, it is possible to carry out a variety of suitable attractive actions depending on the type of fish to be caught.

DETAILED DESCRIPTION OF EMBODIMENTS

An embodiment of a lure according to the present disclosure is described below with reference to the figures. In each of the drawings, there are cases in which the scale of each component has been appropriately changed as required to improve the visibility of the component.

Figure 1:
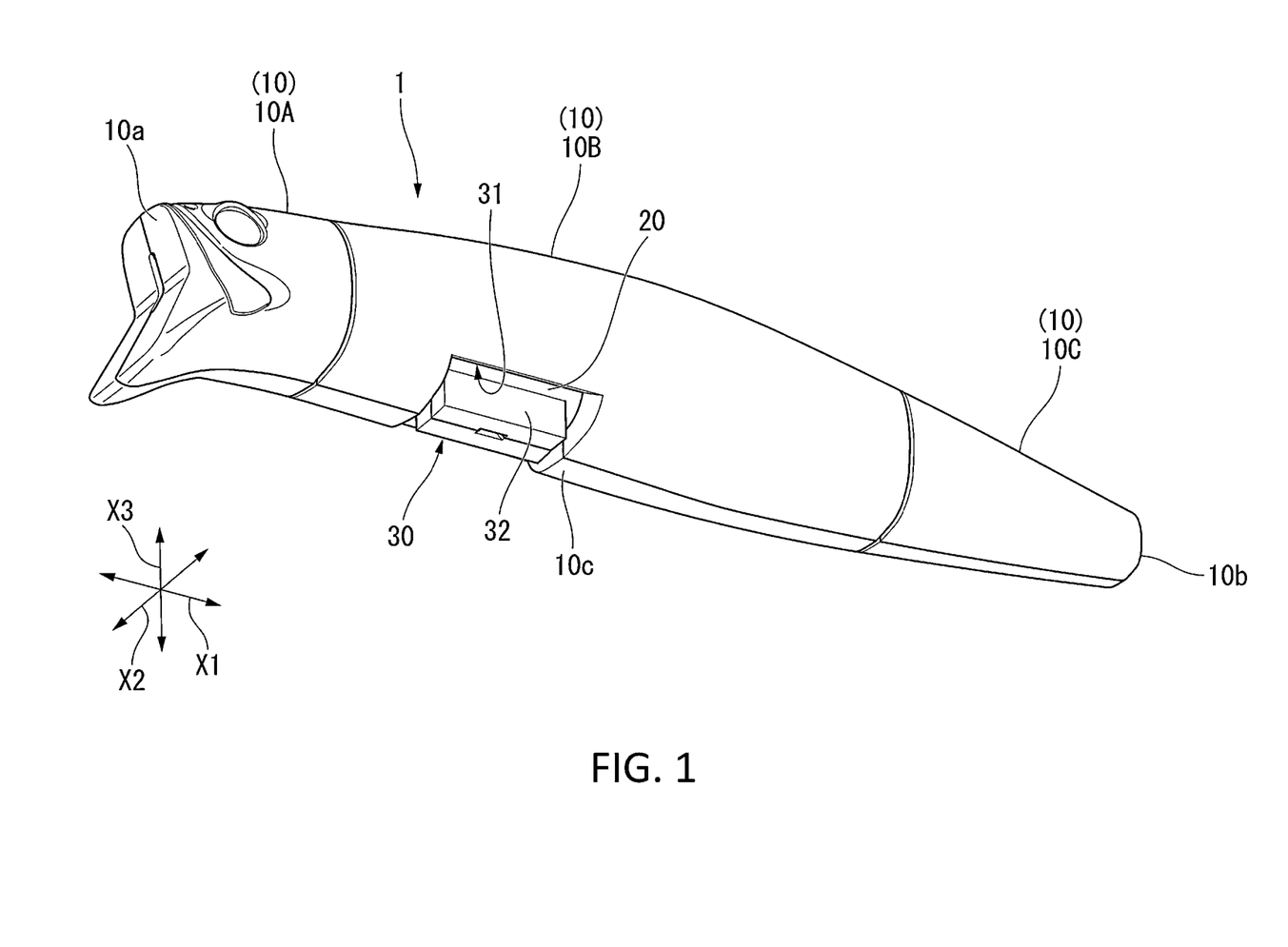
FIG. 1 is a perspective view of a lure according to an embodiment of the present disclosure as seen obliquely from the front.
Figure 2:
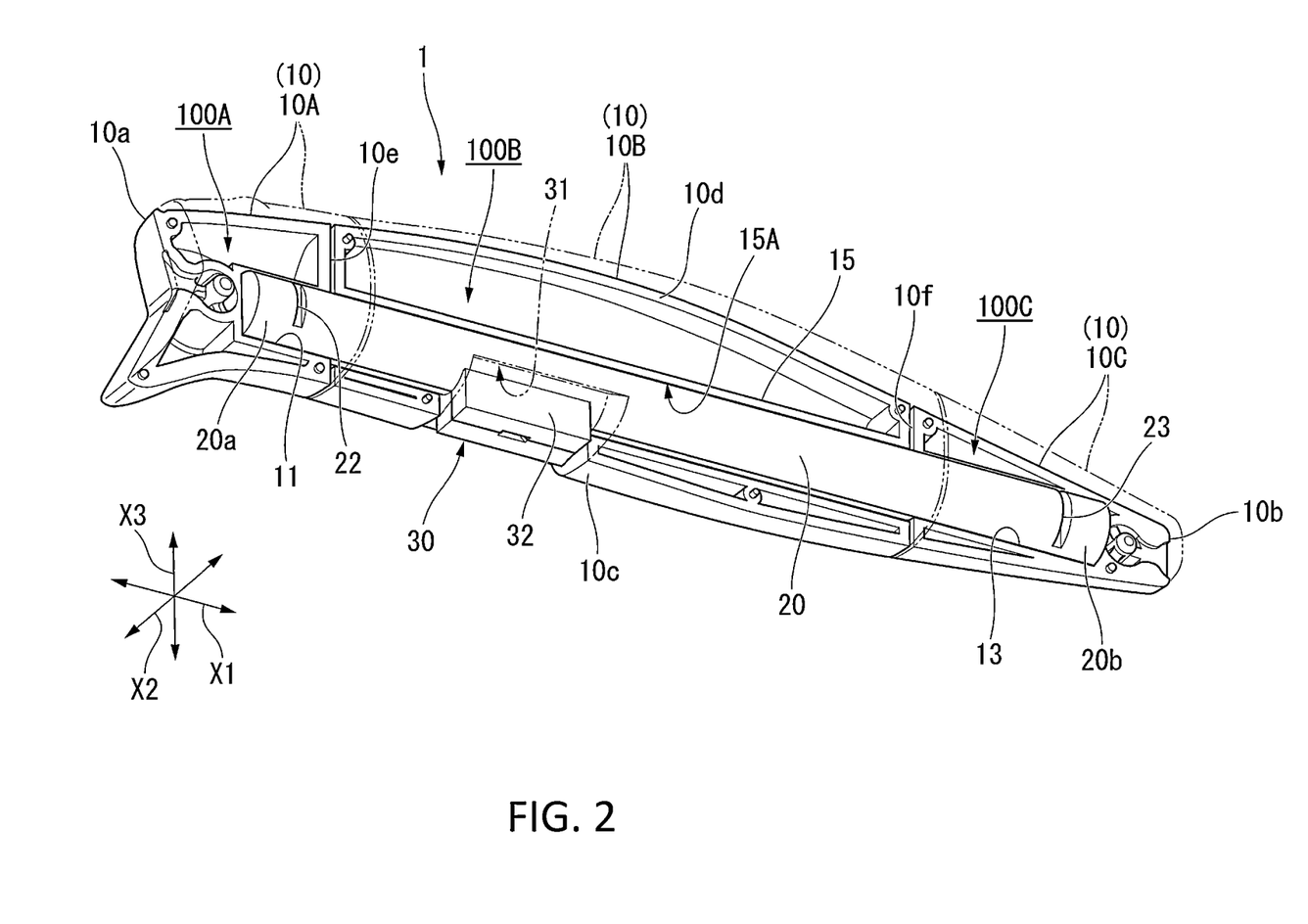
FIG. 2 is a perspective view in which one of half-split bodies of the lure shown in FIG. 1 is omitted.

As shown in FIGS. 1 and 2, a lure 1 according to an embodiment is an example of a lure that is used for fishing, that has a body made of hard plastic, and that resembles the shape of a small fish.

Here, in the lure 1, the direction in which the head and the tail are connected in a straight line is defined as the front-rear direction X1. The head side is defined as the front/front side, and the tail side is defined as the rear/rear side. Further, as seen from above, the lateral direction orthogonal to the front-rear direction X1 is defined as the left-right direction X2, and the up-down direction of the lure 1 when in the swimming attitude is defined as the up-down direction X3 in the following description.

The lure 1 is formed in a streamlined shape that simulates a fish, and is integrally formed by joining peripheral portions 10d of a pair of halves of a body 10 to each other by bonding, welding, or the like. The body 10 is segmented into three parts in the front-rear direction X1 into a head body 10A (first body), a trunk body 10B (second body), and a tail body 10C (third body) in order from front to rear, and each of the bodies is provided so as to be able to swing freely in the left-right direction X2. Each of the bodies 10A, 10B, and 10C has a hollow portion 100A, 100B, and 100C formed therein.

Figure 3:
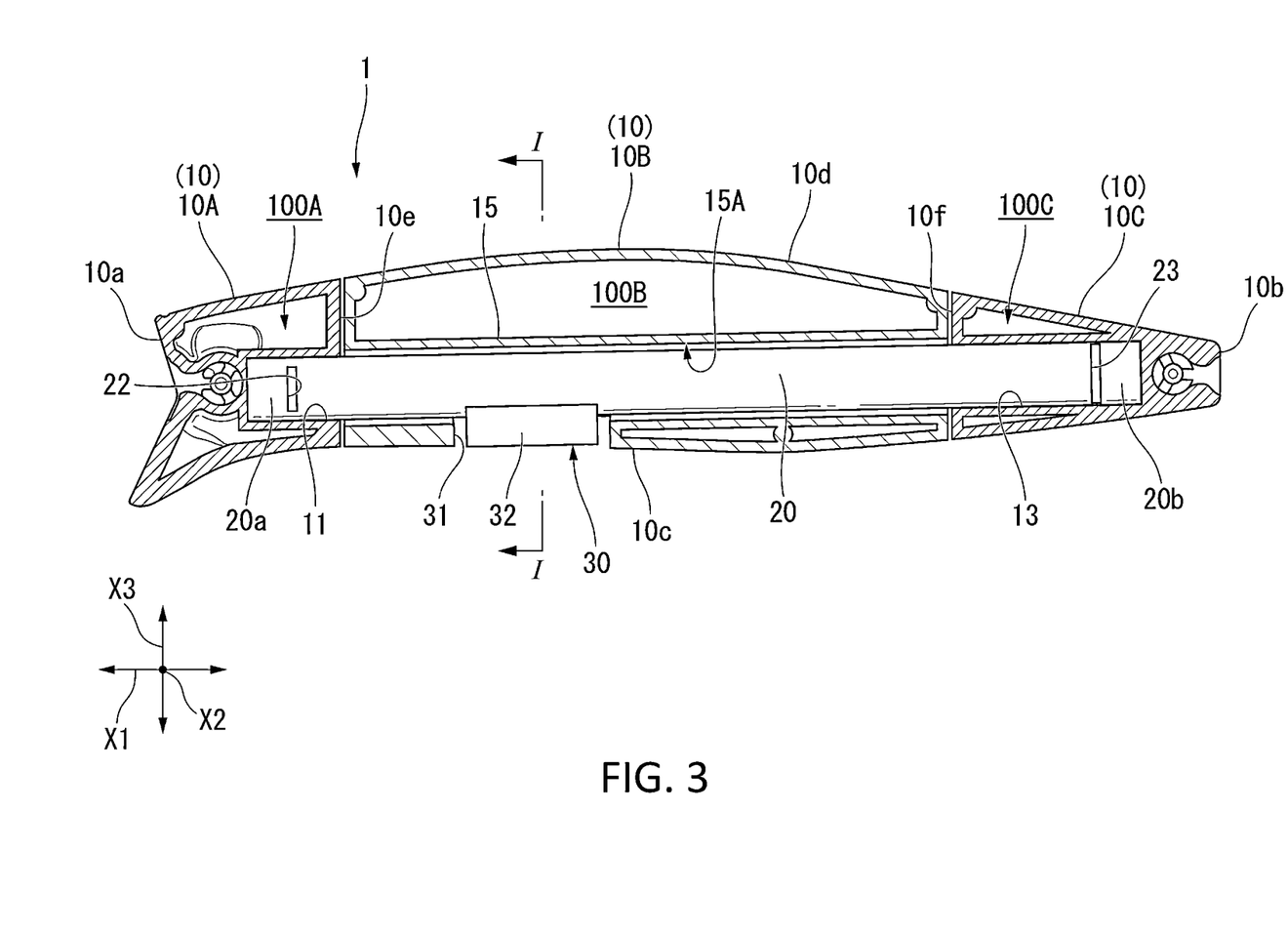
FIG. 3 is a longitudinal cross-sectional view of the lure shown in FIG. 1.
Figure 4:
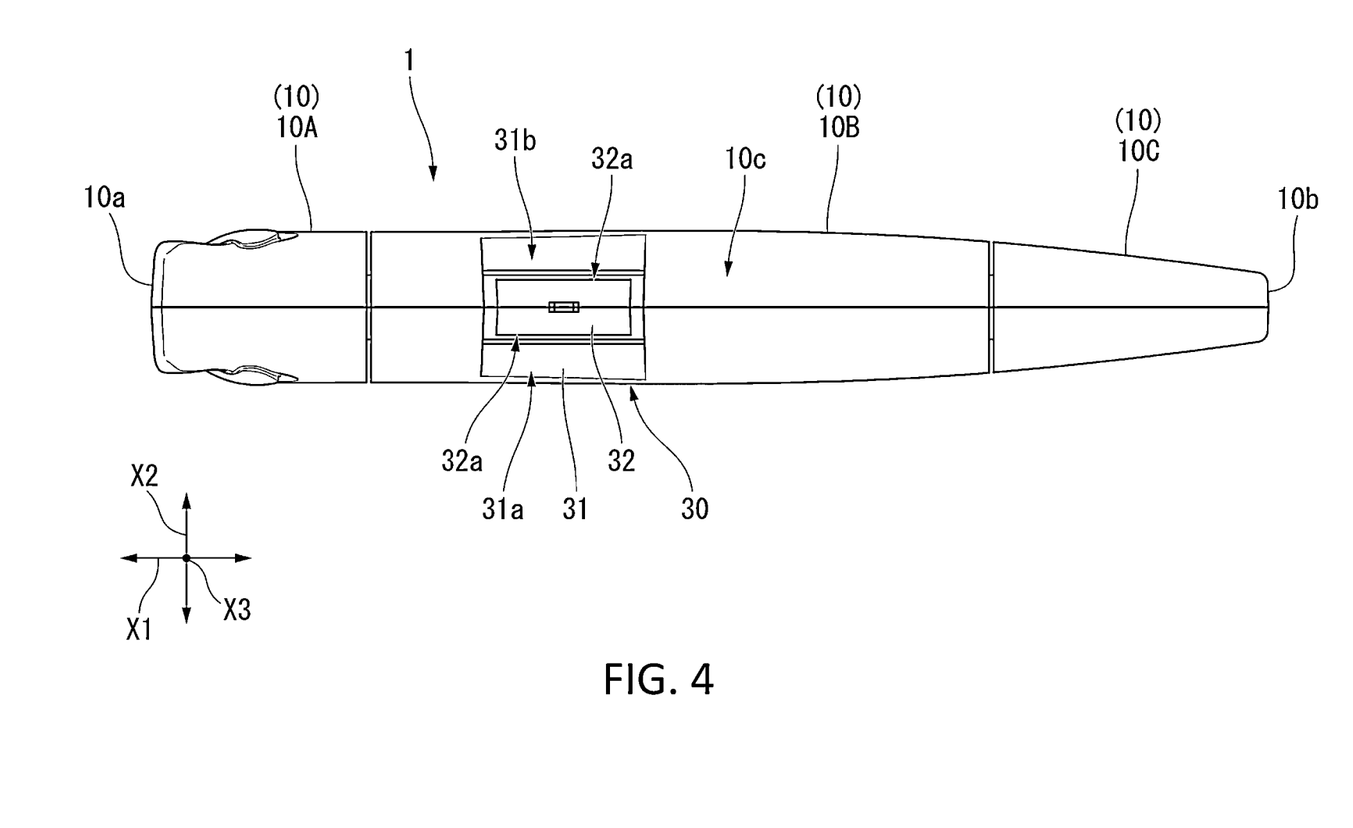
FIG. 4 is a plan view of the lure shown in FIG. 1 as seen from below.

In FIGS. 2 and 3, the left side of the sheet is the head side and the right side of the sheet is the tail side. The lure 1 has a shape in which the cross section is largest at a central portion (at the connecting portion between the head body 10A and the trunk body 10B) in the front-rear direction X1. That is, the lure 1 is thicker from a front-end portion 10a to the central portion and is thinner from the central portion to a rear-end portion 10b, forming a smooth curve overall. The head body 10A is provided on the head side and is formed in a shape imitating roughly the front half of a fish.

The lure 1 includes a swinging shaft 20 (shaft) that extends from the head body 10A toward the tail side and is fixed to the tail body 10C. The swinging shaft 20 has a circular cross section and extends in the front-rear direction X1 inside the body 10. The swinging shaft 20 has a front-end portion 20a that is fixed to the head body 10A so as to be rotationally fixed, and a rear-end portion 20b that is fixed to the tail body 10C so as to be rotationally fixed. The trunk body 10B is supported around the swinging shaft 20 so as to be able to swing.

Figure 5:
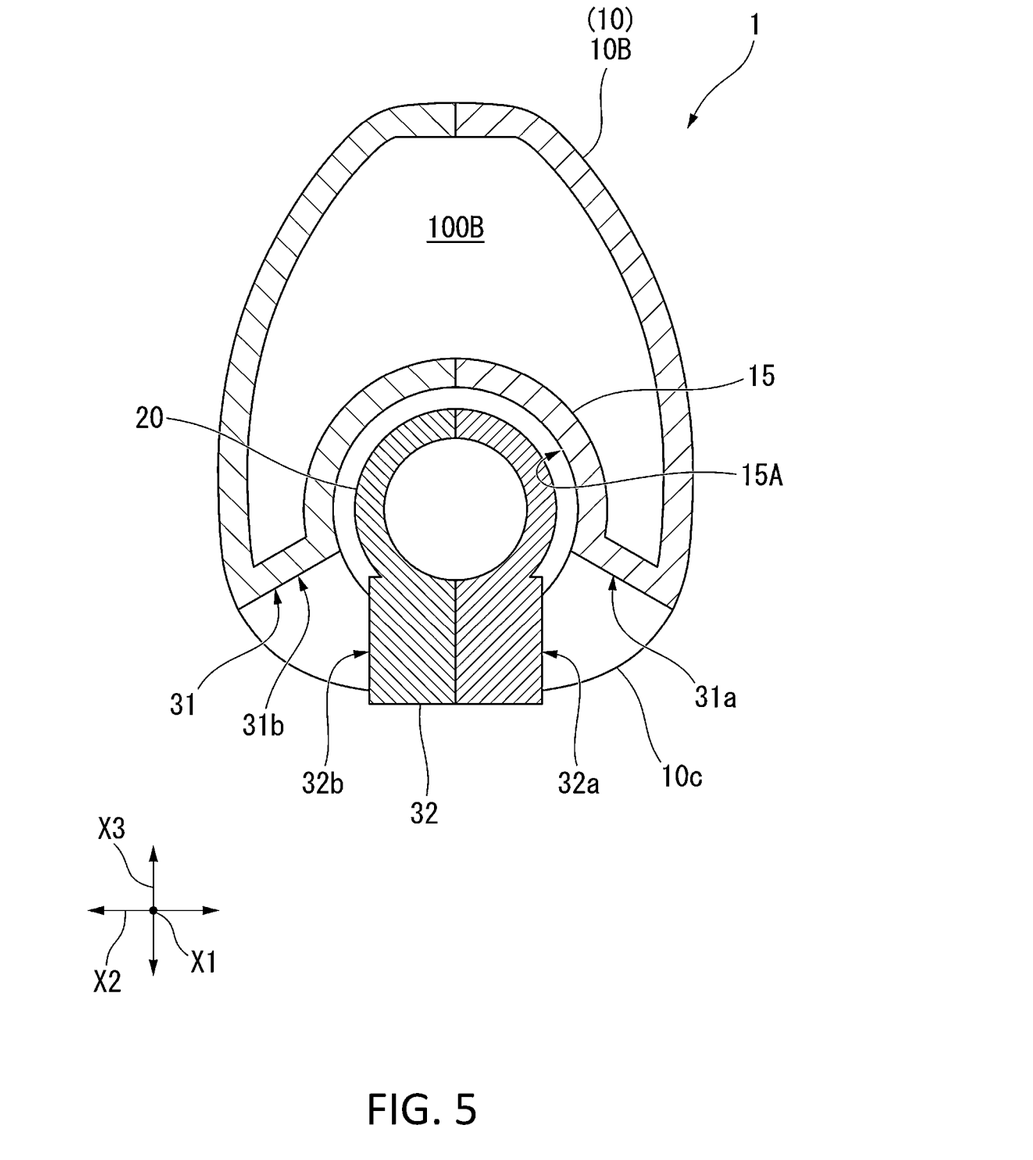
FIG. 5 is a cross-sectional view along line I-I shown in FIG. 3.
Figure 6:
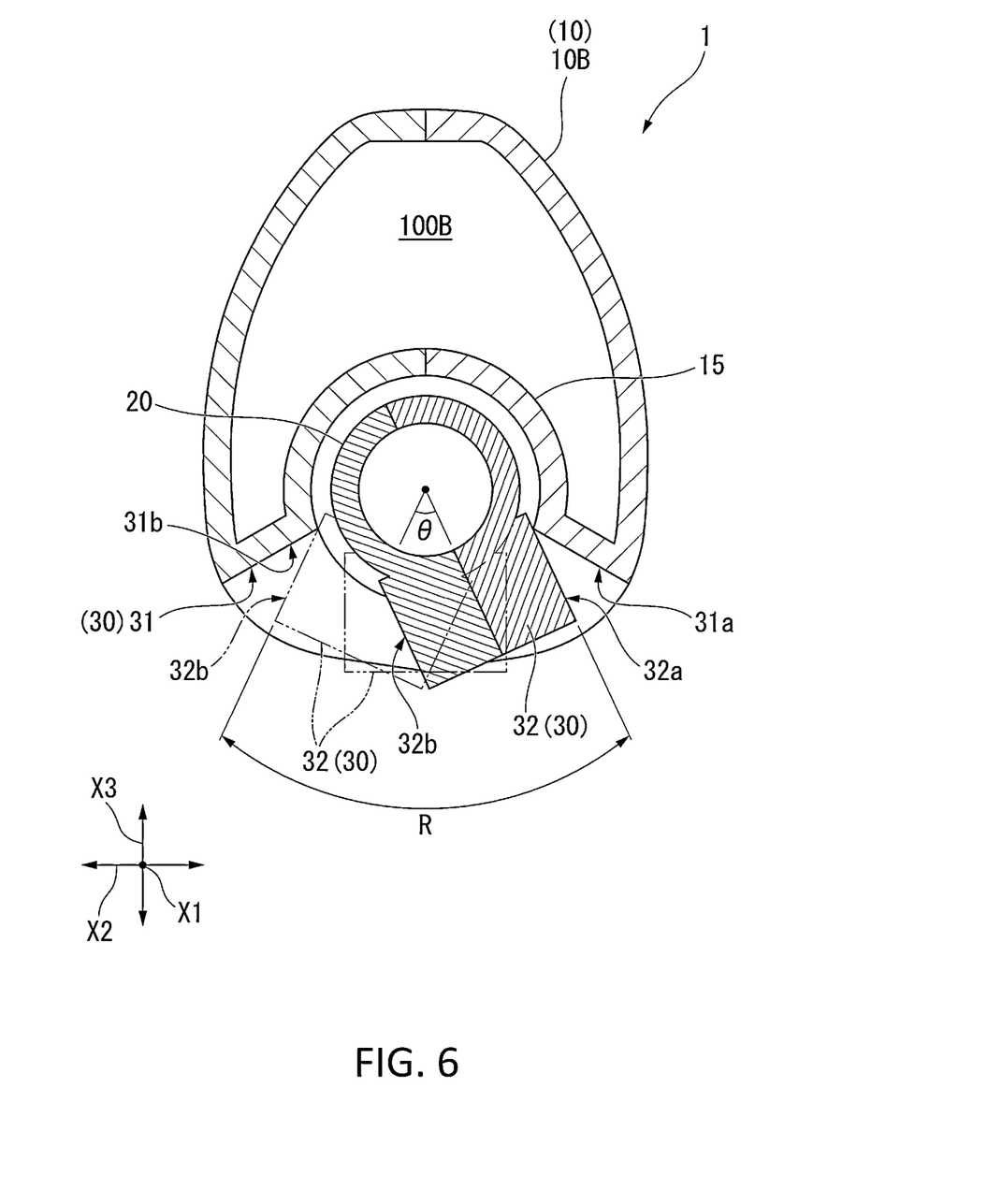
FIG. 6 is a cross-sectional view showing a state in which a swinging shaft in FIG. 5 is swung.

As shown in FIGS. 5 and 6, the lure 1 has a restricting structure 30 that restricts the swing angle θ of the trunk body 10B. The restricting structure 30 includes an opening 31 formed on the trunk body 10B and a protrusion 32 provided on the swinging shaft 20, described further below.

As shown in FIGS. 2 and 3, a first shaft hole 11, in which the front-end portion 20a of the swinging shaft 20 is housed, is formed in the rear portion of the head body 10A. The first shaft hole 11 has a circular cross section and is formed extending forward from a rear wall 10e of the head body 10A. First locking ribs (not shown) that protrude inwardly in the radial direction are provided on both the left and right sides of the first shaft hole 11. The projecting end of the first locking rib forms a straight portion extending in the up-down direction X3. The inner diameter of the first shaft hole 11 is essentially the same as the outer diameter of the swinging shaft 20. The front-end portion 20a of the swinging shaft 20 is tightly engaged with the first shaft hole 11.

A second shaft hole 13, in which the rear-end portion 20b of the swinging shaft 20 is housed, is formed in the front portion of the tail body 10C. The second shaft hole 13 has a circular cross section and extends rearward from a front wall 10f of the tail body 10C. Second locking ribs (not shown) that protrude inwardly in the radial direction are provided on both the left and right sides of the second shaft hole 13. The projecting end of the second locking rib forms a straight portion extending in the up-down direction X3. The inner diameter of the second shaft hole 13 is essentially the same as the outer diameter of the swinging shaft 20. The rear-end portion 20b of the swinging shaft 20 is tightly engaged with the second shaft hole 13. The tail body 10C is integrally provided with the head body 10A, together with the swinging shaft 20.

The trunk body 10B has a cylindrical body 15 that penetrates at essentially the center of the cross section of the trunk body 10B in the front-rear direction X1 (refer to FIG. 5). The cylindrical body 15 has a hole portion 15A. The inner diameter of the hole portion 15A is essentially the same as the outer diameter of the swinging shaft 20. The hole portion 15A houses the swinging shaft 20 so that the swinging shaft 20 is capable of swinging relative to the trunk body 10B and is capable of being coaxially inserted therethrough.

In the trunk body 10B, a hollow portion 100B is formed in the upper portion of the cylindrical body 5. Since the cylindrical body 15 is provided at a position lower than the center of the trunk body 10B in the up-down direction X3 the hollow portion 100B can occupy a large space.

The opening 31 (recess, restricting structure) that is formed in the outer wall of the trunk body 10B is provided at the lower portion 10c at essentially the center of the outer wall of the trunk body 10B in the front-rear direction X1. The opening 31 has a rectangular shape in plan view. Here, the lower portion 10c of the trunk body 10B refers to the portion of the trunk body 10B that is lower than the outermost circumferential portion in the left-right direction X2.

As shown in FIGS. 5 and 6, swing restriction surfaces 31a, 31b on the left and right inner side surfaces of the opening 31, which intersect in a circumferential direction around the axis of the swinging shaft 20 as seen from the front-rear direction X1, form inclined surfaces that gradually extend outward in the left-right direction X2 while extending downward. That is, the left-right direction X2 width of the opening 31 increases downward. The protrusion 32 provided on the swinging shaft 20, described further below, is housed in the opening 31 so as to be able to swing within a prescribed swing range R.

As shown in FIGS. 2 and 3, a first locking groove 22 is formed in the front-end portion 20a of the swinging shaft 20. The first locking groove is to be locked with a first locking rib formed in the first shaft hole 11 of the head body 10A. A second locking groove 23 is formed in the rear-end portion 20b of the swinging shaft 20 The second locking groove 23 is to be locked with a second locking rib formed in the second shaft hole 13 of the tail body 10B. In this manner, the first locking groove 22 and the second locking groove 23 are locked respectively with the first locking rib and the second locking rib, thereby fixing the swinging shaft 20 to the head body 10A and the tail body 10C so as to be rotationally fixed.

As shown in FIGS. 2-5, the swinging shaft 20 includes the protrusion 32 (restricting structure) that protrudes downward. The protrusion 32 is disposed so as to be housed inside the opening 31. As shown in FIG. 6, the swing range R (swing angle θ) of the protrusion 32 is restricted by the pair of swing restriction surfaces 31a, 31b of the opening 31. The swing range R is the range between the position at which the first side surface 32a of the protrusion 32 contacts the first swing restriction surface 31a and the position at which the second side surface 32b of the protrusion 32 contacts the second swing restriction surface 31b.

Next, the operation of the lure 1 will be described in detail based on the drawings.

The lure 1 according to the present embodiment comprises the head body 10A disposed on the head side, the swinging shaft 20 that extends from the head body 10A toward the tail side, the trunk body 10B that is supported around the swinging shaft 20 so as to be able to swing, and the restricting structure 30 that is provided on the trunk body 10B and the swinging shaft 20, the restricting structure 30 restricting the swing angle θ of the trunk body 10B.

Figure 7:
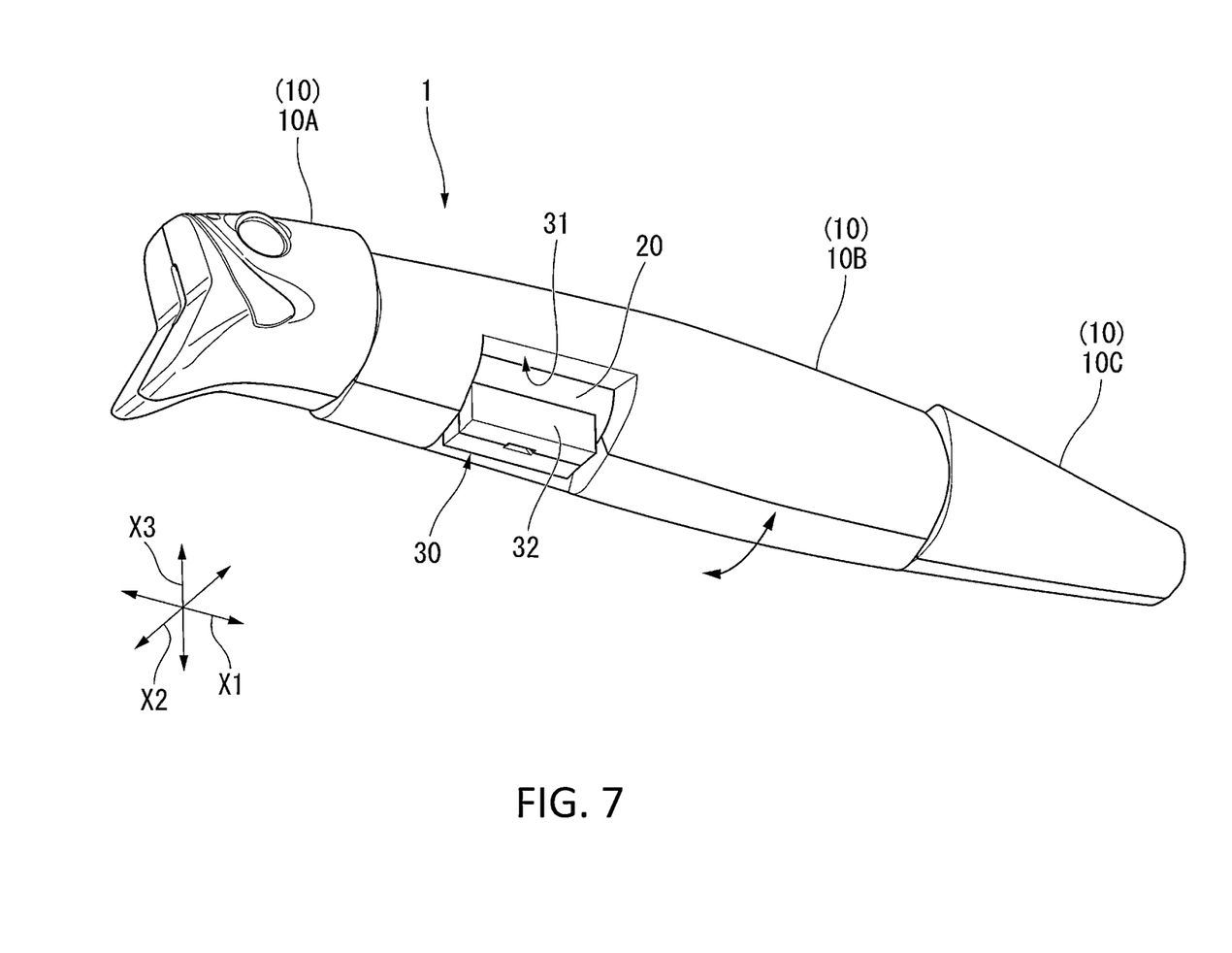
FIG. 7 is a perspective view showing a state in which a trunk body in FIG. 1 is swung.

In the present embodiment, as shown in FIGS. 2, 6, and 7, when the lure 1 swims, the trunk body 10B swings with respect to the head body 10A within the range restricted by the restricting structure 30. Specifically, the head body 10A on the head side swings together with the swinging shaft 20 in accordance with the movement of the fishing line, and the trunk body 10B that is separate from the head body 10A swings in a phase different from that of the head body 10A. Thus, the head body 10A moves differently than the trunk body 10B. Then, since the head body 10A and the trunk body 10B are restricted to swing within the prescribed swing range R as described above, a swinging motion can be realized without rotating over the entire circumference. As a result, it is possible to attract fish in a manner not possible for a conventional lure, such as changing the light that hits the lure 1 or the vibration frequency of the lure itself when in a swimming attitude.

Additionally, in the present embodiment, when the lure 1 is subjected to swash, waves, or the tide, the head body 10A moves differently to the trunk body 10B in an efficient manner. As a result, it is possible to move the lure 1 so as to blend with the current, for example. Thus, allowing the lure to move in a manner that is more attractive to predatory fish than the movement of a conventional lure, in which the lure simply floats on water.

In addition, in the present embodiment, the swinging shaft 20 is fixed to the head body 10A. As a result, since the swinging shaft 20 integrally rotates with the head body 10A, it is possible to restrict the swing angle θ of the trunk body 10B with respect to the head body 10A.

Additionally, in the present embodiment, the restricting structure 30 includes the protrusion 32 that protrudes from the swinging shaft 20 and the opening 31 that is formed on the trunk body 10B, and that houses the protrusion 32. By this configuration, it is possible to set the swing range R of the protrusion 32 provided on the swinging shaft 20 by the opening 31 formed in the trunk body 10B. Therefore, the swing range R can be easily set and movement matching the shape of the body 10 can be easily achieved.

In addition, in the present embodiment, the opening 31 is formed in the trunk body 10B. Therefore, since the thickness portion of the outer wall of the trunk body 10B can be used as the restricting structure 30, the space inside the body 10 can be more effectively used than a case in which a restricting structure is provided inside the trunk body 10B.

Additionally, in the present embodiment, it is possible to access the swinging shaft 20 and the restricting structure 30 from outside of the lure via the opening 31. This structure makes it is possible to perform maintenance on the swinging shaft 20 and the restricting structure 30, and to adjust the swing range R from the outside of the lure.

In addition, in the present embodiment, the opening 31 is provided in the lower portion of the trunk body 10B. As a result, the swinging shaft 20 and the restricting structure 30 can be arranged in the lower portion of the trunk body 10B, so that a large space (hollow portion 100B) for imparting buoyancy can be provided in the upper portion of the trunk body 10B.

Additionally, in the present embodiment, the trunk body 10B includes the opening 31 through which the swinging shaft 20 is coaxially inserted and that holds the swinging shaft 20. As a result, the swinging shaft 20 is swingably held by the opening 31 in a manner that suppresses wobbling of the swing of the swinging shaft 20. This structure can achieve a stable swing of the swinging shaft 20, and it is possible to design the lure 1 with the desired movement.

In addition, in the present embodiment, the tail body 10C that is fixed to the swinging shaft 20 is provided on the tail side of the trunk body 10B. As a result, when the lure 1 swims, the trunk body 10B, the head body 10A and the tail body 10C, respectively rotate so as to swing relative to each other within a rotation range restricted by the restricting structure 30. Specifically, the head body 10A rotates together with the tail body 10C and the swinging shaft 20 in accordance with the movement of the fishing line. The the trunk body 10B, which is separate from the head body 10A and the tail body 10C, rotates later than the head body 10A and the tail body 10C, so that the trunk body 10B moves differently from the head body 10A and the tail body 10C. As a result, it is possible to generate bubbles and sounds in the water to excellently attract fish.

By the lure according to the present embodiment configured as described above, it is possible to carry out a variety of suitable attractive actions depending on the type of fish to be caught.

The above-described embodiment of the lure according to the disclosure is presented as an example and is not intended to limit the scope of the disclosure. The embodiment can be implemented in a variety of other forms; furthermore, various omissions, substitutions and changes can be made without departing from the essence of the disclosure. Embodiments and modifications include those that can be easily conceived of by a person skilled in the art, those that are essentially the same, and those that are of equivalent scope.

For example, in the embodiment described above, the body 10 is segmented into three parts in the front-rear direction X1 and includes the head body 10A, the trunk body 10B, and the tail body 10C, but the mode of segmentation is not limited thereto. For example, the lure may be composed only of a first body, which is the head body 10A, and a second body, in which the second body is composed of the trunk body 10B and the tail body 10C as an integrated body. In this case, a shaft that extends from the first body toward the tail side is provided. The second body is supported around the shaft so as to be capable of swinging, and the shaft has a restricting structure that restricts the swing angle of the second body.

In addition, the configuration can further include at least one body between the trunk body 10B and the tail body 10C. As a result, a plurality of intermediate bodies including the trunk body 10B are provided between the head body 10A and the tail body 10C, so that complex movements (attraction) of the lure can be achieved by the plurality of intermediate bodies.

The plurality of intermediate bodies can be configured such that, for example, intermediate bodies that can swing relative to the swinging shaft 20 and intermediate bodies that are fixed are alternately arranged, or such that the swing angle of each of the swingable intermediate bodies is different.

In addition, in the present embodiment, the swinging shaft 20 is fixed to the head body 10A and the tail body 10C, but the swinging shaft 20 may be supported so as to be rotatable with respect to the head body 10A and/or the tail body 10C.

Furthermore, the restricting structure 30 of the present embodiment is configured to include the protrusion 32 and the opening 31. The protrusion protrudes from the swinging shaft 20 (shaft) and the opening 31 (recess) is formed in the trunk body 10B (second body). The opening 31 houses the protrusion 32. However, the configuration is not limited thereto. For example, it suffices if the restricting structure 30 is provided on at least one of the second body and the shaft.

In addition, the configuration of the restricting structure is not limited to a configuration composed of the opening 31 and the protrusion 32, as in the present embodiment. For example, the opening 31 can be a bottomed recess formed on the inner surface of the outer wall of the second body, instead of penetrating the outer wall of the second body, and a protrusion can be housed in that recess so as to be able to swing at a prescribed swing angle $\theta$.

Additionally, a protrusion that protrudes inwardly can be provided on the second body side, and the protrusion can be housed in the shaft so as to be capable of swinging at a prescribed swing angle $\theta$.

Furthermore, the position of the opening 31 (recess) is provided in the lower portion of the second body in the present embodiment, but the position may be elsewhere, such as in the upper portion of the second body.

In addition, the configuration of the restricting structure is not limited to a configuration in which the swing angle $\theta$ is mechanically set; for example, a configuration in which a magnet is used to restrict the swing range can be employed. In this case, a magnetic body can be disposed on a portion of the shaft in the circumferential direction, and magnets can be attached at the ends of the swing range on the inner surface of the second body, to set a prescribed swing angle $\theta$.

Additionally, the configuration of the trunk body 10B of the present embodiment is such that the cylindrical body 15 extending in the front-rear direction X1 is provided. The swinging shaft 20 is coaxially inserted in the cylindrical body 15, and the large hollow portion 100B is formed above the cylindrical body 15. However, no limitation is imposed by this structure. For example, the swinging shaft 20 can be supported so as to be rotatable by a ring member, instead of the cylindrical body 15.

What is claimed is:

1. A lure, comprising
a first body arranged on a head side;
a shaft extending from the first body toward a tail side;
a second body supported around the shaft and configured to rotate around a center axis of the shaft; and
a restricting structure provided on at least one of the second body and the shaft and configured to restrict a rotation angle of the second body.
2. The lure according to claim 1, wherein the shaft is fixed to the first body.
3. The lure according to claim 1, wherein the restricting structure includes
a protrusion protruding from the shaft, and
a recess formed on the second body and housing the protrusion.
4. The lure according to claim 3, wherein the recess is an opening in the second body.
5. The lure according to claim 3, wherein the recess is provided below the second body.
6. The lure according to claim 1, wherein the second body includes a hole portion through which the shaft is configured to be coaxially inserted and to hold the shaft.
7. The lure according to claim 1, further comprising, a third body that is fixed to the shaft on the tail side of the second body.
8. The lure according to claim 7, further comprising at least one body between the second body and the third body.

* * * * *